(12) United States Patent
Goracy

(10) Patent No.: US 6,276,423 B1
(45) Date of Patent: Aug. 21, 2001

(54) PORTABLE TIRE BEAD BREAKER

(76) Inventor: Grant Goracy, 13563 Cantlay St., Van Nuys, CA (US) 91405

( * ) Notice: Subject to any disclaimer, the term of this patent is extended or adjusted under 35 U.S.C. 154(b) by 0 days.

(21) Appl. No.: 09/435,751

(22) Filed: Nov. 8, 1999

Related U.S. Application Data

(60) Provisional application No. 60/108,428, filed on Nov. 13, 1998.

(51) Int. Cl.$^7$ ................................................. B60C 25/132
(52) U.S. Cl. ................................................... 157/1.17
(58) Field of Search ........................ 157/1, 1.1, 1.17, 157/1.2, 1.21, 1.22, 1.24, 1.26, 1.28, 1.3, 14

(56) References Cited

U.S. PATENT DOCUMENTS

| | | | | |
|---|---|---|---|---|
| 2,505,172 | * | 4/1950 | Coats | 157/1.24 |
| 2,602,494 | * | 7/1952 | Larson | 157/1.17 |
| 2,672,184 | * | 3/1954 | Bergeron | 157/1.26 |
| 2,973,791 | * | 3/1961 | French | 157/14 |
| 3,008,512 | * | 11/1961 | Foster | 157/1.28 |
| 3,493,029 | * | 2/1970 | Kimball | 157/1.2 |
| 4,676,291 | * | 6/1987 | Bolger | 157/1.17 |
| 4,969,498 | * | 11/1990 | Sheets | 157/1.17 |
| 5,740,848 | | 4/1998 | Goracy . | |

OTHER PUBLICATIONS

"Franklin Motorsports" Catalog, dated Mar. 1, 1999, p. 50.
"National Cart News" magazine, dated Aug. 1999, p. 66.
"Go Racing"0 magazine, dated Oct. 15, 1999, p. 50.

* cited by examiner

*Primary Examiner*—D. S. Meislin
(74) *Attorney, Agent, or Firm*—Kelly, Bauersfeld, Lowry & Kelley, LLP

(57) ABSTRACT

A portable tire bead breaker includes a base over which a tire and rim may be placed, a beam attached to the base and extending upwardly therefrom, an arm assembly pivotally attached to the beam so as to extend over the base, and a driver attached to the arm and extending downwardly towards the base. The arm assembly includes an arm attached to the beam at a first pivot point and a cam connected to the beam at a second pivot point. The arm includes opposing arcuate slots and the cam includes a pin slidingly disposed within the slots. The driver has foot at a lower end thereof, and the length of the driver is adjustable. To break a tire bead, a handle is connected to the cam which is pivoted to cause the arm to pivot and the driver to be increasingly extended downwardly until the foot engages the tire and breaks a seal between the tire and the rim. The tire bead breaker can be folded into a compact unit for storage and transportation.

19 Claims, 6 Drawing Sheets

PORTABLE TIRE BEAD BREAKER

RELATED APPLICATION

This application claims priority from provisional application Ser. No. 60/108,428 filed Nov. 13, 1998.

BACKGROUND OF THE INVENTION

The present invention relates tire bead breakers. More particularly, the present invention relates to a portable tire bead breaker.

In order to de-mount a tire it must be separated from the tire rim at the seal, known as the bead, on the periphery of the tire and rim before the tire is forced away from the rim. Breaking the tire bead seal from the rim is a difficult task. The worker is handling a heavy and an unwieldy rim and an inflated tire which does not provide much flexibility.

Various devices have been conceived to de-bead tires. In most cases, the devices are stationary, massive, and expensive. However, there are certain circumstances which require the tire de-beading equipment to be portable. Although portable tire de-beading devices exist, these devices are bulky and inefficient. Instead of using such cumbersome portable devices, workers typically rely on tools that are inefficient and oftentimes damage or destroy tire. For example, a worker may utilize a thin and relatively long tool, such as a screw driver, and a hammer in an attempt to break the tire bead. Use of a hammer and a screw driver or the like can damage the tire, and is also hazardous to the worker.

Accordingly, there is a need for a lightweight and portable compact tool for breaking the seal of tires from rims. What is also needed is a portable tire bead breaking tool which is simple to operate. Such a tool should be capable of being used in small spaces while providing optimum leverage. The present invention fulfills these needs and provides other related advantages.

SUMMARY OF THE INVENTION

The present invention resides in a portable tire bead breaker which is durable yet lightweight and is simple to use. The tire bead breaker of the present invention is also foldable into a compact unit which is easily transported and stored.

The portable tire bead breaker generally comprises a base over which a tire and rim may be placed, a beam extending upwardly from the base, an arm assembly pivotally attached to the beam so as to extend over the base, and a driver pivotally attached to the arm and extending downwardly towards the base.

The base is pivotable with respect to the beam. A stop is formed in the base and configured to securely receive the beam to prevent the beam from pivoting during use. A ring extends upwardly from the base for stabilizing the tire and rim. The arm assembly includes an arm pivotally attached to the beam at a first pivot point and a cam pivotally connected to the beam at a second pivot point. The arm includes two opposed walls having a space therebetween, and arcuate slots formed in each wall generally opposite one another. The cam includes a pin slidingly disposed within the slots. The cam is configured to accept a removable handle. As the cam is pivoted, the pin slides over the arc of the slots causing the arm to pivot and driver to be increasingly extended downwardly towards the base.

The driver has a foot at a lower end thereof and configured to form a wedge. The driver includes an outer sleeve and an inner shaft slidable within the outer sleeve. Both the outer sleeve and inner shaft each have aligned pairs of apertures for adjusting the length of the driver.

In use, a tire and rim are placed on the base over the ring and the cam is pivoted causing the arm to pivot and the driver to be extended downwardly towards the tire and rim until the foot engages the tire and breaks a seal between the tire and the rim.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
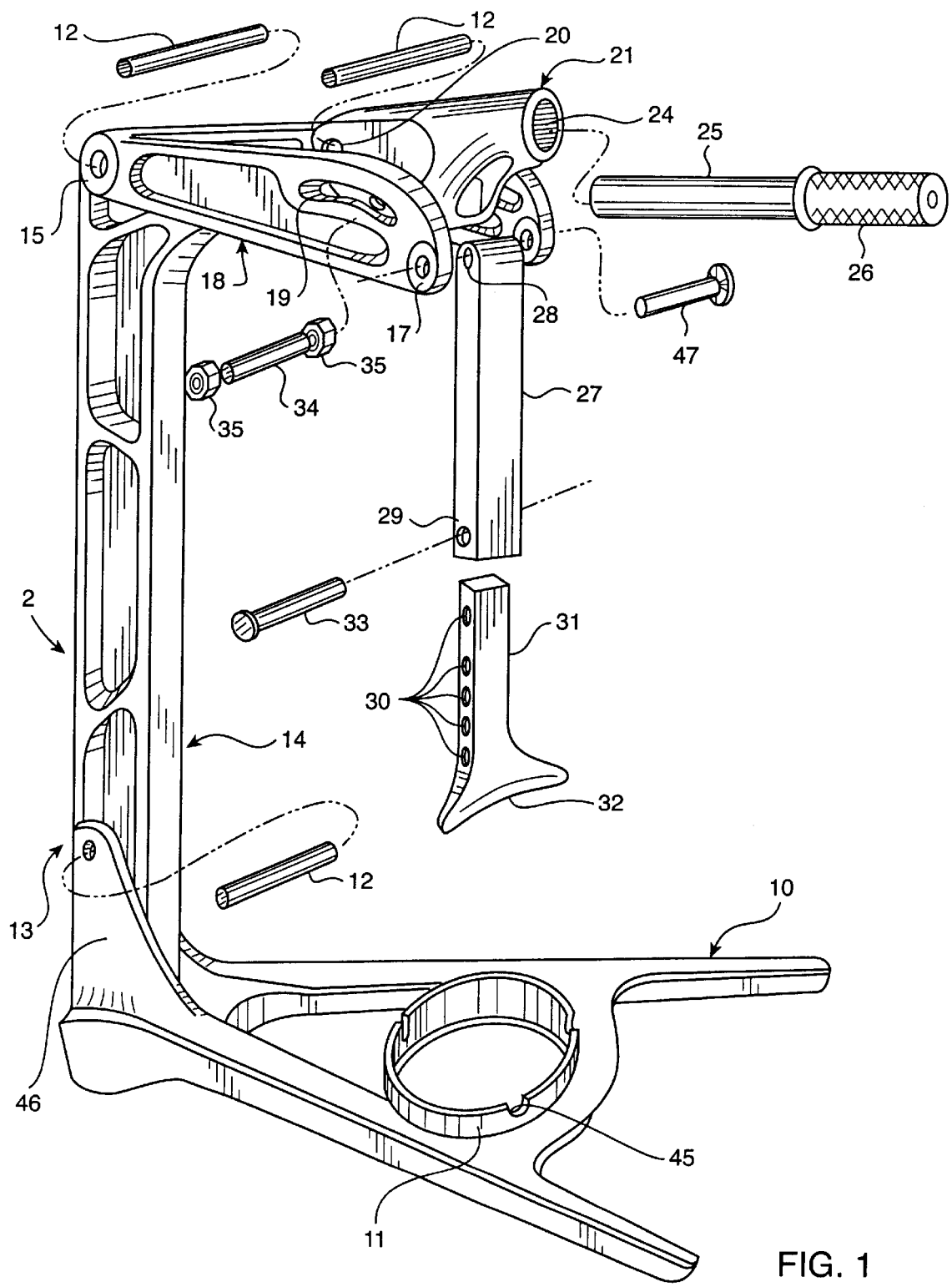
FIG. 1 is a partially exploded perspective view of a tire bead breaker embodying the present invention.

As shown in the drawings for purposes of illustration, the present invention is concerned with a tire bead breaker, generally referred to by reference number 2. The tire bead breaker 2 includes a base 10 having a positive stop 44 that halts the movement of the base 10 when set in working position. Typically, the base 10 is comprised of two arms spreading apart from one another from the stop 44 in a Y-shape. At an end of the Y-shaped base 10 are upwardly extending ears 46 which accommodate a pivot pin 12 through aperture 9. The ears 46 act to reduce the torque applied to the stop 44 by dispersing torque into the beam 14. The base 10 also includes a tire rim stabilizing ring 11 which accommodates rims with bead locks 45.

The beam 14 securely rests within stop 44 and is further connected to the base 10 through ear aperture 9 and pivot point 13 by pin 12. In the working position, the beam 14 is deployed in a vertically upright position relative to the base 10. At an end of the beam 14 opposite the base 10 protrudes another ear 46 away from the beam 14 and towards the open end of the Y-shaped base 10. The protruding ear 46 includes first and second pivot points 15 and 23 for pivotal attachment to arm 18 and cam 21.

Figure 2:
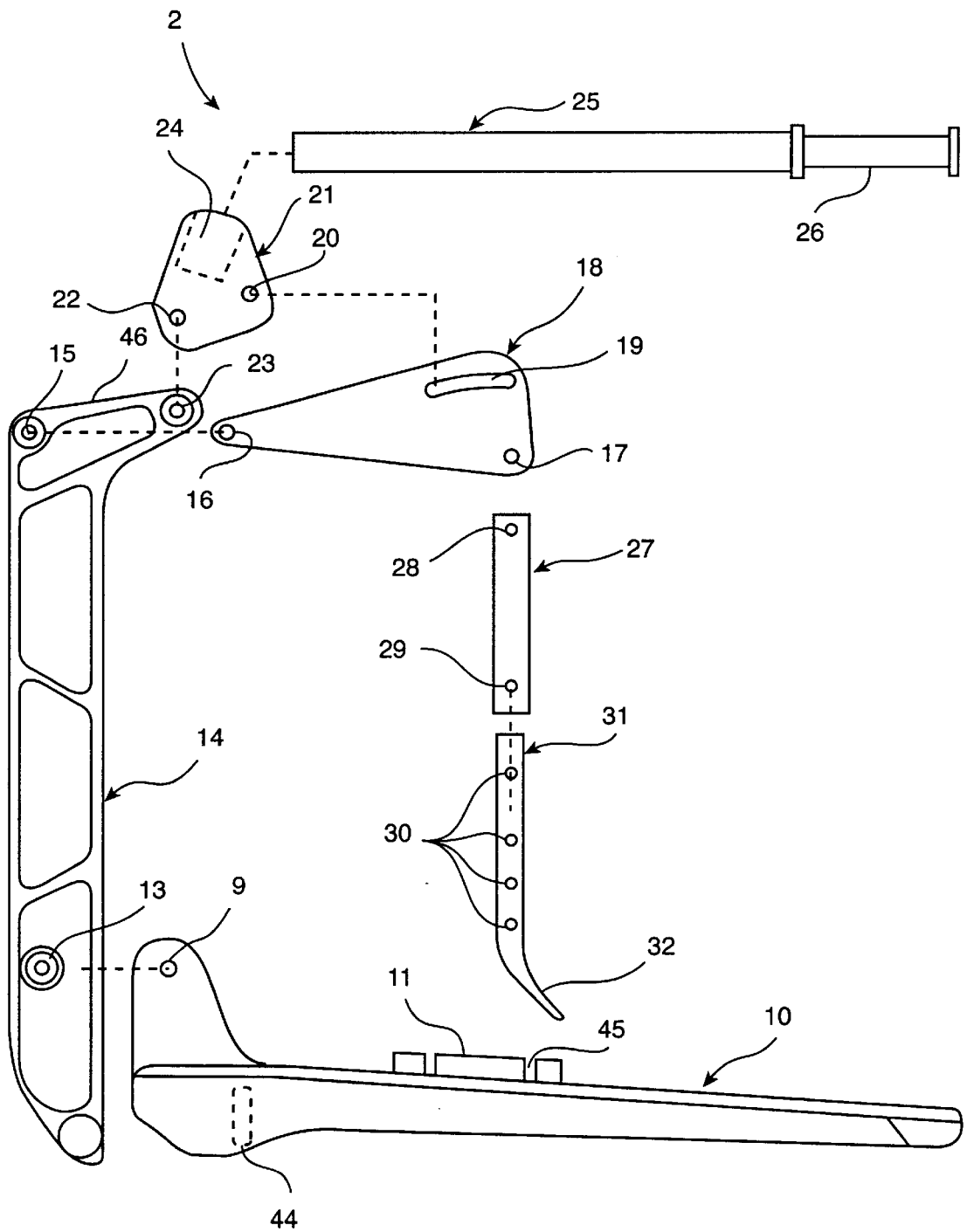
FIG. 2 is an exploded side elevational view of the tire bead breaker of FIG. 1.

Referring to FIGS. 1 and 2, arm 18 is comprised of two walls which meet at aperture 16 for connection to the first pivot point of the beam 15. An arcuate slot 19 is formed in each wall towards the end of the arm 18 distant from the beam 14. Cam 21 lies within the space between the walls of arm 18 and is pivotally connected through aperture 22 to the second pivot point 23 of the beam 14. The cam 21 includes a pin 34 and bushings 35 which are slidingly connected to the opposed arcuate slots 19. The cam 21 also includes a recess 24 for the removable attachment of a handle 25.

A driver is comprised of sleeve 27 and inner shaft 31. The driver sleeve is connected to the arm 18 by a pin 47 through arm aperture 17 and sleeve aperture 28 in such a manner so as to allow the driver sleeve 27 to pivot. An inner driver shaft 31 is slidable into the driver sleeve 27 and locked into a desired length by inserting pin 33 through aligned apertures 29 and 31 of the shaft 31 and the sleeve 27. Thus, the driver shaft 31 can be lowered or raised to accommodate different sized tires. The driver shaft 31 has a foot 32 formed at a lower end thereof and configured to form a wedge.

Figure 3:
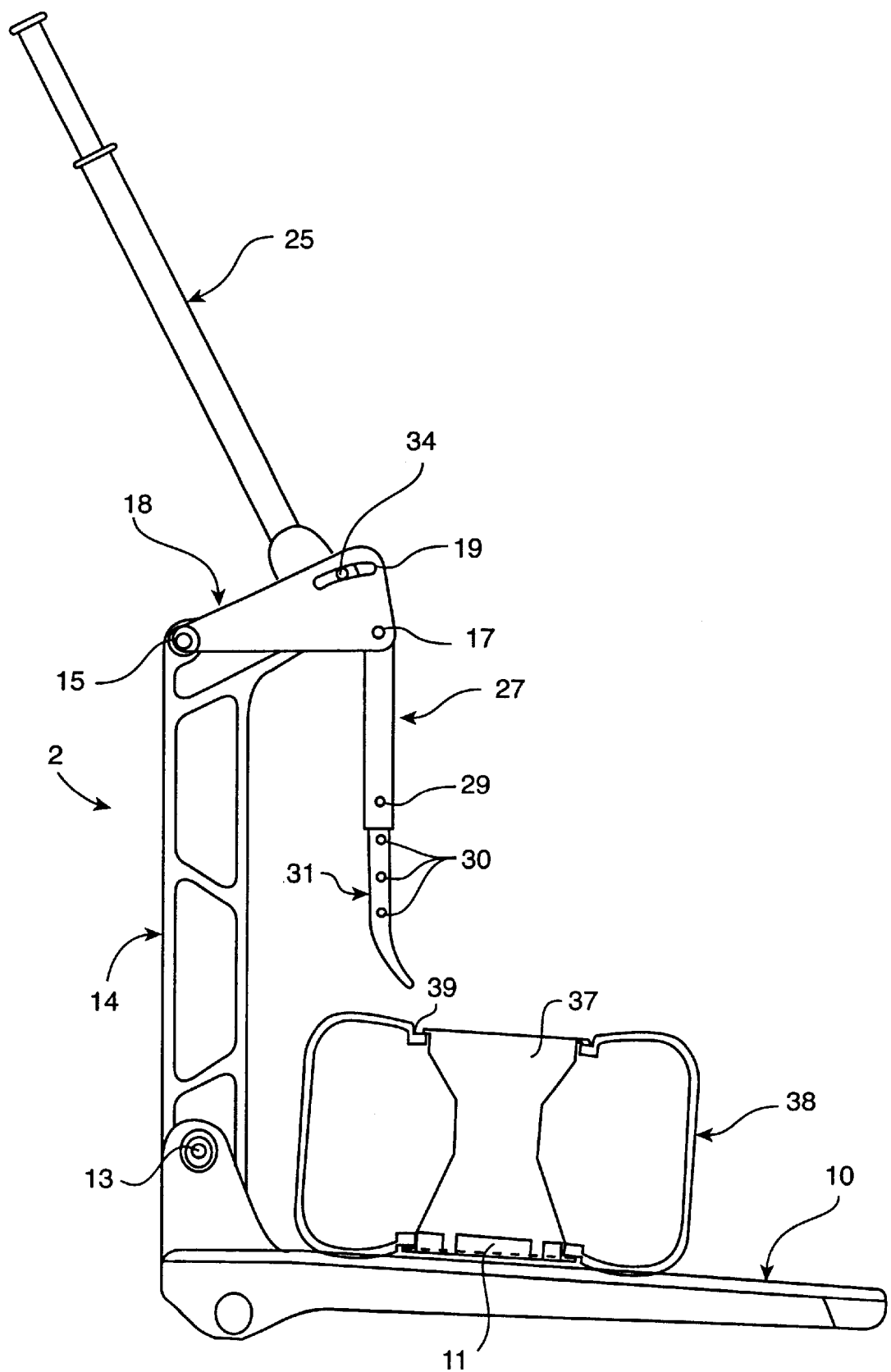
FIG. 3 is a side elevational view of the tire bead breaker of FIGS. 1 and 2, illustrating a tire and rim placed upon the base.
Figure 4:
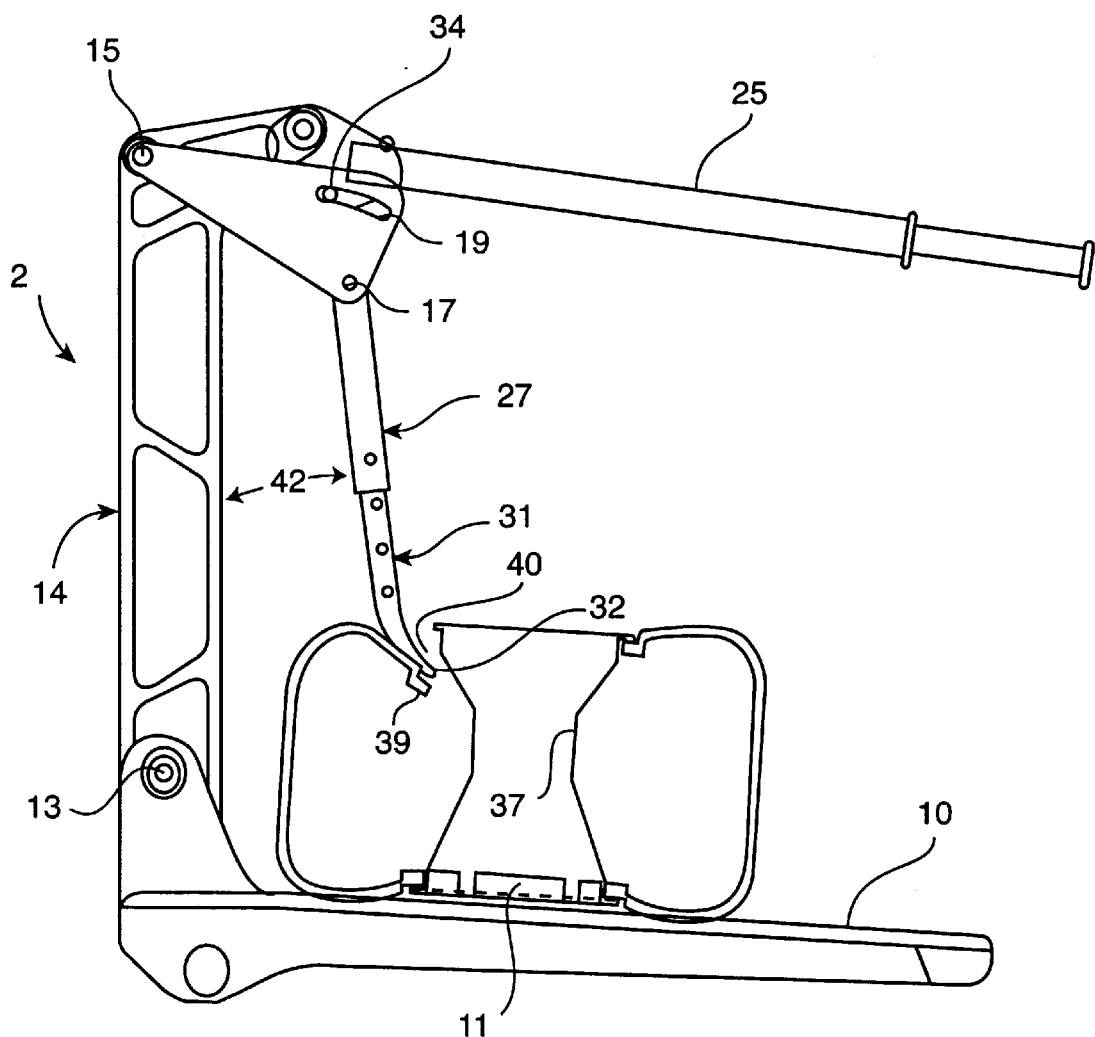
FIG. 4 is a side elevational view similar to FIGS. 1–3, illustrating a driver of the tire and bead breaker breaking a seal between the tire and rim.
Figure 5:
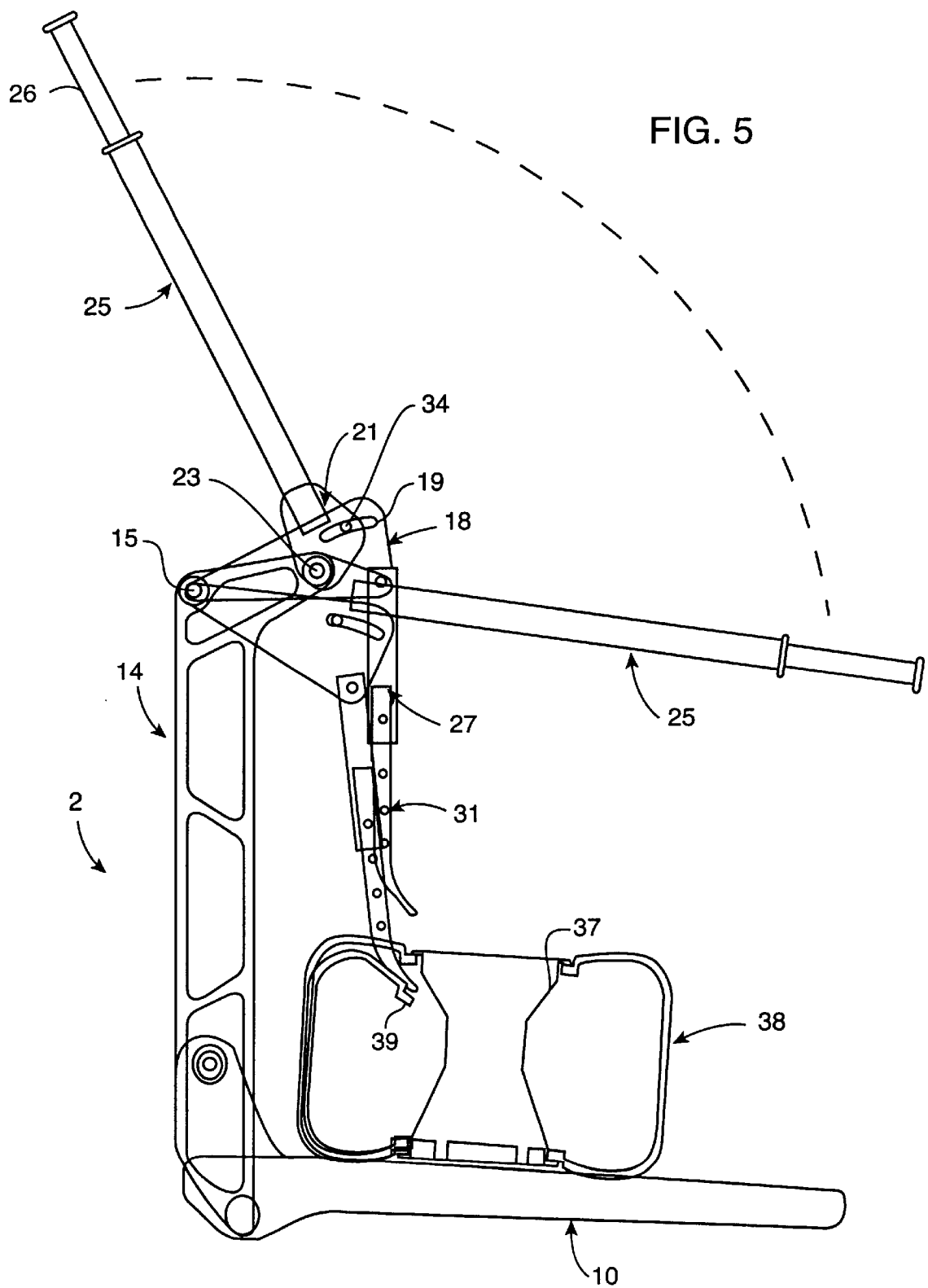
FIG. 5 is a side elevational view similar to FIGS. 1–4, illustrating the beginning and end positions of the tire bead breaker during use.

Referring now to FIGS. 3–5, the tire bead breaker 2 of the present invention is used by placing a tire and rim 37 and 38 on the stabilizing ring 11 of the base 10. The driver shaft 31 is adjusted in length within driver sleeve 27 so that there is a gap between the foot 32 of the shaft 31 and the tire 38. The handle 25 is inserted into the cam 21 and the handle is pulled towards tire 38 and base 10 causing the cam 21 to pivot. As the cam 21 pivots, pin 34 frictionally slides arcuate slots 19 causing arm 18 to pivot downwardly. As the arm 18 pivots downwardly, the driver sleeve and shaft 27 and 31 also move downwardly until foot 32 contacts the tire 38. As the handle 25 is pulled towards the base 10, the foot 32 of the driver shaft 31 continues to press upon the tire 38 until the bead seal 39 is broken away from the rim to create a gap 40. The dual-pivoting nature of the cam 21 and arm 18 create increased leverage, requiring less effort to break the seal 29. The pressurized air escapes from the tire as the seal 29 is broken, allowing the tire to be easily removed and repaired or replaced as necessary. The starting and ending positions of the tire bead breaker 2 is shown in FIG. 5.

Figure 6:
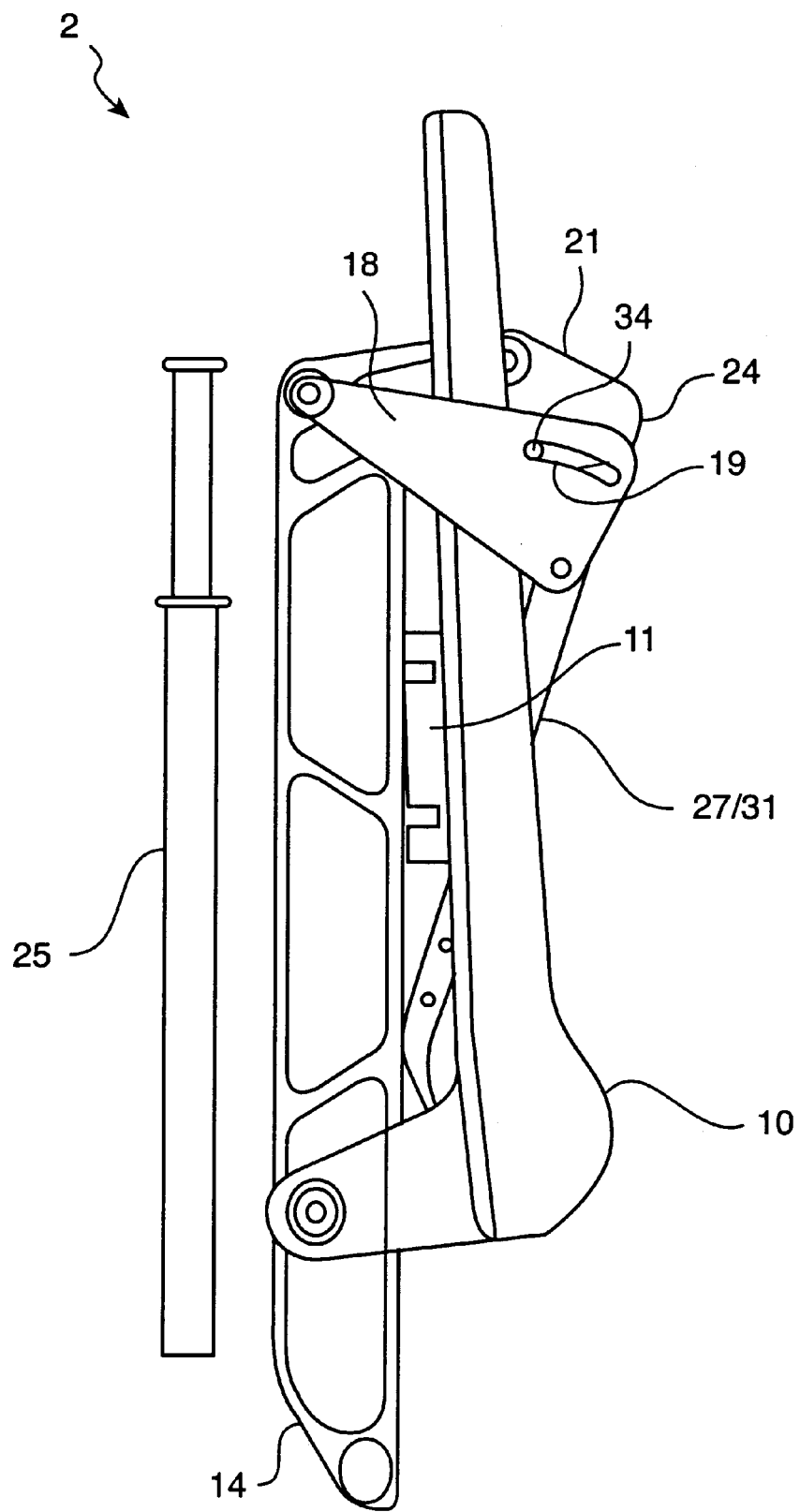
FIG. 6 is an elevational view of the tire bead breaker of FIGS. 1–5 in a folded and compact state.

As illustrated in FIG. 6, the tire bead breaker 2 of the present invention is collapsible into a folded unit for storage and transportation. To collapse the invention, pin 12 is removed from pivot point 13 and the beam 14 is removed from stop 44. Pin 12 is reinserted into pivot point 13 once the base 10 is pivoted towards the beam 14. The cam 18 and 21 are pivoted towards the beam as well until cam pin 34 is halted by reaching the end of travel in the arcuate slots 19 and the driver sleeve and shaft 27 and 31 are tucked neatly between the legs of the base 10. The handle 25 is removed from cam 21 and placed alongside the folded tire bead breaker 2 for storage and transportation. The compact folded unit can be wrapped with straps or placed into a carrying bag for convenience.

Although an embodiment has been described in detail for purposes of illustration, various modifications may be made without departing from the scope and spirit of the invention. Accordingly, the invention is not to be limited, except as by the appended claims.

What is claimed is:

1. A portable tire bead breaker, comprising:
   a base over which a tire and rim may be placed;
   a beam extending upwardly from the base;
   an arm assembly pivotally attached to the beam so as to extend over the base, the arm assembly including an arm pivotally attached to a first pivot point of the beam, and a cam pivotally connected to a second pivot point of the beam and to the arm; and
   a driver pivotally attached to the arm and extending downwardly towards the base, the driver having a foot at a lower end thereof, whereby upon placement of the tire and rim on the base and forcefully pivoting the arm downwardly, the foot engages the tire and breaks a seal between the tire and the rim.

2. The tire bead breaker of claim 1, including a rim stabilizing ring extending upwardly from the base.

3. The tire bead breaker of claim 1, wherein the driver foot is configured to form a wedge.

4. The tire bead breaker of claim 1, wherein the driver includes an outer sleeve and an inner shaft slidable within the outer sleeve, each having aligned pairs of apertures for adjusting the length of the driver.

5. The tire bead breaker of claim 1, wherein the arm includes an arcuate slot, and wherein the cam includes a pin slidingly disposed within the slot so that as the cam is pivoted the arm pivots and the driver is increasingly extended downwardly.

6. The tire bead breaker of claims 5, wherein the arm includes two opposed walls having a space therebetween, and arcuate slots formed in each wall generally opposite one another, the pin of the cam being slidingly connected to the opposed arcuate slots so that as the cam is pivoted the pin slides over the arc of the slots causing the arm to pivot and the driver to be increasingly extended downwardly.

7. The tire bead breaker of claim 1, including a handle removably connected to the cam.

8. The tire bead breaker of claim 1, wherein the base is pivotable with respect to the beam.

9. The tire bead breaker of claim 8, including a stop formed in the base and configured to engage the beam to prevent the beam from pivoting beyond the stop.

10. The tire bead breaker of claim 9, wherein the base is pivotable with respect to the beam.

11. A portable tire bead breaker, comprising:
    a base over which a tire and rim may be placed;
    a beam pivotally attached to the base and extending upwardly from the base;
    a stop formed in the base and configured to engage the beam to prevent the beam from pivoting beyond the stop;
    an arm assembly pivotally attached to the beam so as to extend over the base, the arm assembly including an arm pivotally attached to a first pivotpoint of the beams and a cam pivotally connected to a second pivot point of the beam and to the arm, the arm including an arcuate slot and the cam including a pin slidingly disposed within the slot; and
    a driver pivotally attached to an end of the arm distal from the beam and extending downwardly towards the base and having a foot at a lower end thereof, whereby upon placement of the tire and rim on the base and pivoting the cam, the arm pivots and the driver is increasingly extended downwardly causing the foot to forcefully engage the tire and break a seal between the tire and the rim.

12. The tire bead breaker of claim 11, wherein the driver foot is configured to form a wedge.

13. The tire bead breaker of claim 11, wherein the driver includes an outer sleeve and an inner shaft slidable within the outer sleeve, each having aligned pairs of apertures for adjusting the length of the driver.

14. The tire bead breaker of claim 11, including a handle removably connected to the cam.

15. The tire bead breaker of claim 11, wherein the arm includes two opposed walls having a space therebetween, and arcuate slots formed in each wall generally opposite one another, the pin of the cam being slidingly connected to the opposed arcuate slots so that as the cam is pivoted the pin slides over the arc of the slots causing the arm to pivot and the driver to be increasingly extended downwardly.

16. A portable tire bead breaker, comprising:

a base over which a tire and rim may be securely placed and a tire and rim stabilizer fixed to the base;

a beam extending upwardly from the base;

an arm assembly pivotally attached to the beam so as to extend over the base, the arm assembly including an arm pivotally attached to a first pivot point of the beam, and a cam pivotally connected to a second pivot point of the beam and to the arm, the cam being configured to accept a removable handle, the arm including an arcuate slot and the cam including a pin slidingly disposed within the slot; and a driver pivotally attached to an end of the arm distal from the beam and extending downwardly towards the base and having a foot configured to form a wedge at a lower end thereof, whereby upon placement of the tire and rim on the base and pivoting the cam, the arm pivots and the driver is increasingly extended downwardly causing the foot to forcefully engage the tire and break a seal between the tire and the rim.

17. The tire bead breaker of claim 16, wherein the arm includes two opposed walls having a space therebetween, and arcuate slots formed in each wall generally opposite one another, the pin of the cam being slidingly connected to the opposed arcuate slots so that as the cam is pivoted the pin slides over the arc of the slots causing the arm to pivot and the driver to be increasingly extended downwardly.

18. The tire bead breaker of claim 16, wherein the driver includes an outer sleeve and an inner shaft slidable within the outer sleeve, each having aligned pairs of apertures for adjusting the length of the driver.

19. The tire bead breaker of claim 10, including a stop formed in the base and configured to engage the beam to prevent the beam from pivoting beyond the stop.

* * * * *